(12) United States Patent
Kumar

(10) Patent No.: US 7,028,978 B2
(45) Date of Patent: Apr. 18, 2006

(54) PROPORTIONAL SOLENOID-CONTROLLED FLUID VALVE HAVING COMPACT PRESSURE-BALANCING ARMATURE-POPPET ASSEMBLY

(76) Inventor: Viraraghavan S. Kumar, 107 Nemo Cir., Palm Bay, FL (US) 32907

( * ) Notice: Subject to any disclaimer, the term of this patent is extended or adjusted under 35 U.S.C. 154(b) by 103 days.

(21) Appl. No.: 10/083,450

(22) Filed: Feb. 25, 2002

(65) Prior Publication Data

US 2002/0079472 A1 Jun. 27, 2002

Related U.S. Application Data

(63) Continuation-in-part of application No. 09/905,397, filed on Jul. 13, 2001, now Pat. No. 6,604,726, which is a continuation-in-part of application No. 09/846,425, filed on May 1, 2001, now Pat. No. 6,715,732, which is a continuation of application No. 09/535,757, filed on Mar. 28, 2000, now Pat. No. 6,224,033, which is a continuation of application No. 08/988,369, filed on Dec. 10, 1997, now Pat. No. 6,047,947, which is a continuation-in-part of application No. 08/632,137, filed on Apr. 16, 1996, now Pat. No. 5,785,298.

(60) Provisional application No. 60/219,722, filed on Jul. 19, 2000.

(51) Int. Cl.
*F16K 31/02* (2006.01)

(52) U.S. Cl. .................. 251/129.07; 251/129.15; 335/281

(58) Field of Classification Search ........... 251/129.07, 251/129.15, 129.16, 129.17, 282; 335/281
See application file for complete search history.

(56) References Cited

U.S. PATENT DOCUMENTS

| | | | | |
|---|---|---|---|---|
| 2,543,010 A | * | 2/1951 | Gardner | 251/129.07 |
| 3,368,791 A | | 2/1968 | Wells | |
| 3,446,471 A | * | 5/1969 | Westphal | 251/129.17 |
| 3,446,473 A | * | 5/1969 | Barker | 251/64 |
| 3,606,241 A | * | 9/1971 | Bornholdt | 251/129.07 |
| 3,627,257 A | * | 12/1971 | Stampfli | 251/129.07 |
| 3,684,238 A | * | 8/1972 | Michellone et al. | 251/129.07 |
| 3,900,822 A | | 8/1975 | Hardwick et al. | 335/268 |
| 4,442,998 A | | 4/1984 | Ohyama et al. | 251/129 |
| 4,463,332 A | | 7/1984 | Everett | 335/258 |
| 4,494,726 A | * | 1/1985 | Kumar et al. | 251/29 |
| 4,579,145 A | | 4/1986 | Leiber et al. | 137/625.65 |
| 4,633,209 A | | 12/1986 | Belbel et al. | 335/261 |
| 4,635,683 A | | 1/1987 | Nielsen | 137/625.65 |

(Continued)

FOREIGN PATENT DOCUMENTS

CA  2020787  10/1994

(Continued)

*Primary Examiner*—John Rivell
(74) *Attorney, Agent, or Firm*—The Bilicki Law Firm PC

(57) ABSTRACT

A proportional solenoid-driven valve control assembly comprised of a moveable, magnetic armature adjacent to a fixed magnetic pole piece, providing fluid leakage containment, and having no non-magnetic element for alignment, support, or magnetic flux path control. A valve unit coupled with the armature contains a fluid cavity in fluid communication with a fluid inlet port and a fluid exit port. The valve is closed by a poppet coupled to the armature. To compensate for fluid pressures exerted against the poppet, a flow restriction is provided between an armature cavity and the fluid cavity. In addition, a bore is formed through the armature to provide fluid communication between the fluid exit port and the armature cavity. This serves to balance fluid pressures at the fluid inlet and exit ports applied to the opposite sides of the fluid flow restriction.

43 Claims, 4 Drawing Sheets

U.S. PATENT DOCUMENTS

| | | | |
|---|---|---|---|
| 4,767,097 A | 8/1988 | Everett et al. | 251/129.08 |
| 4,830,332 A * | 5/1989 | Miura et al. | 251/129.07 |
| 4,852,853 A * | 8/1989 | Toshio et al. | 251/129.07 |
| 4,953,825 A | 9/1990 | Osumi et al. | 251/129.17 |
| 4,954,799 A | 9/1990 | Kumar | 335/236 |
| 5,010,312 A | 4/1991 | Motykiewicz | 335/261 |
| 5,064,166 A | 11/1991 | Schechter | 251/129.15 |
| 5,066,980 A | 11/1991 | Schweizer | 335/255 |
| 5,110,087 A | 5/1992 | Studtmann et al. | 251/129.16 |
| 5,131,624 A | 7/1992 | Kreuter et al. | 251/129.18 |
| 5,218,999 A | 6/1993 | Tanimoto | 137/625.65 |
| 5,240,227 A | 8/1993 | Sich | 251/129.16 |
| 5,301,921 A | 4/1994 | Kumar | 251/129.08 |
| 5,407,174 A | 4/1995 | Kumar | 251/129.08 |
| 5,417,373 A | 5/1995 | Facchin | 239/585.3 |
| 5,427,352 A | 6/1995 | Brehm | 251/64 |
| 5,447,288 A | 9/1995 | Keuerleber et al. | 251/129.17 |
| 5,462,253 A | 10/1995 | Asthana et al. | 251/121 |
| 5,516,076 A | 5/1996 | Stobbs et al. | 251/129.16 |
| 5,547,165 A | 8/1996 | Brehm et al. | 251/129.16 |
| 5,967,487 A | 10/1999 | Cook et al. | 251/64 |
| 6,047,947 A | 4/2000 | Kumar | 251/129.16 |
| 6,224,033 B1 | 5/2001 | Kumar | 251/129.16 |
| 6,604,726 B1 * | 8/2003 | Kumar | 251/129.17 |

FOREIGN PATENT DOCUMENTS

| | | |
|---|---|---|
| DE | 12 88 857 B | 2/1969 |
| EP | 0204293 | 12/1986 |
| EP | 0 681 128 A1 | 11/1995 |

* cited by examiner

PROPORTIONAL SOLENOID-CONTROLLED FLUID VALVE HAVING COMPACT PRESSURE-BALANCING ARMATURE-POPPET ASSEMBLY

CROSS-REFERENCE TO RELATED APPLICATIONS

This application claims benefit of U.S. Provisional Application Ser. No. 60/219,722 filed Jul. 19, 2000.

The present application is a continuation-in-part of U.S. patent application Ser. No. 09/905,397, filed Jul. 13, 2001, now U.S. Pat. No. 6,604,726 by V. Kumar, entitled: "Proportional Solenoid-Controlled Fluid Valve Assembly Without Non-Magnetic Alignment Support Element" (hereinafter referred to as the '397 application), which is a continuation-in-part of U.S. patent application Ser. No. 09/846,425, filed May 1, 2001, now U.S. Pat. No. 6,715,732 by V. Kumar, (hereinafter referred to as the '425 application), which is a continuation of U.S. patent application Ser. No. 09/535,757, filed Mar. 28, 2000, now U.S. Pat. No. 6,224,033, issued May 1, 2001 (hereinafter referred to as the '033 patent), which is a continuation of U.S. patent application Ser. No. 08/988,369, filed Dec. 10, 1997, now U.S. Pat. No. 6,047,947 (hereinafter referred to as the '947 patent), issued Apr. 11, 2000, which is a continuation-in-part of U.S. patent application Ser. No. 08/632,137, filed Apr. 16, 1996, now U.S. Pat. No. 5,785,298, issued Jul. 28, 1998 (hereinafter referred to as the '298 patent), each application being assigned to the assignee of the present application and the disclosures of which are incorporated herein.

FIELD OF INVENTION

The present invention relates in general to solenoid-actuated fluid control valves of the type disclosed in the above-referenced applications and patents, for use in precision flu id flow regulation systems, such as those that require precise control of the rate of fluid flow, including but not limited to pneumatic and hydraulic regulation. The present invention is particularly directed to a reduced hardware complexity configuration for effectively balancing inlet and outlet pressures of the fluid ports of the valve, so that valve poppet position will be defined exclusively by the solenoid, thereby ensuring precision control of fluid flow through the valve.

BACKGROUND

A number of precision fluid metering applications, such as micro-pneumatic and fuel injection systems, as non-limiting examples, employ solenoid-driven actuators to control fluid flow through a fluid supply valve. Optimally, fluid flow through the valve is to be maintained very closely in proportion to the current applied to the solenoid. However, varying fluid pressure conditions at the valve's inlet and/or outlet ports can significantly impact the ability of the solenoid to provide the precise metering control desired.

In order to deal with this problem, it is common practice to incorporate into the valve a pressure balancing sub-assembly, such as a dual diaphragm-based pressure-balancing mechanism of the type diagrammatically shown in cross-section in FIG. 1. This dual diaphragm mechanism serves to compensate or effectively 'balance' out the fluid pressures at each of its inlet and outlet ports such that that the only translation forces acting on the valve orifice-closing poppet will be those imparted by the solenoid-driven armature.

More particularly, in the example valve architecture of FIG. 1, compensation for the fluid inlet pressure P1 of a fluid applied to a valve inlet port 11 of a solenoid-operated fluid valve 10 is provided by 'upper' diaphragm 21, installed between armature-poppet connecting rod 23 and solenoid actuator assembly 25. The upper end of armature-poppet connecting rod 23 engages moveable armature 24 of the solenoid actuator, while the lower of armature-poppet connecting rod 23 engages poppet 27, which is sized to be flush against valve seat 31 surrounding valve orifice 33. Valve orifice 33 provides fluid communication between fluid cavity 35, to which fluid inlet pressure P1 at valve inlet port 11 is applied, and fluid exit port 37 from which fluid outlet pressure P2 is derived.

By making the annular area $A_{D1}$ of 'upper' diaphragm 21 substantially the same as or very close to that of the area $A_O$ of orifice 33, the downward force (as viewed in FIG. 1) imparted by the fluid inlet pressure P1 against poppet 27 will be substantially the same as, or performance-wise sufficiently close to, the 'upward' force imparted by the fluid inlet pressure P1 against upper diaphragm 21, thereby effectively neutralizing the contribution of the fluid inlet pressure P1 to the position of poppet 27 relative to the valve seat 31.

In a complementary manner, compensation for fluid outlet pressure P2 at fluid exit port 37 is provided by 'lower' diaphragm 41, installed between lower end 43 of poppet-connecting rod 45 and valve body 47. Upper end 51 of poppet-connecting rod 45 engages poppet 27. Similar to the compensation mechanism for fluid inlet pressure P1, the annular area $A_{D2}$ of 'lower' diaphragm 41 is made substantially the same as or very close to that of the area $A_O$ of valve orifice 33.

As a consequence, any upward force imparted by fluid outlet pressure P2 against poppet 27, which might otherwise tend to lift poppet 27 off of valve seat 31 (and thereby undesirably render solenoid control ineffective), will be countered by a 'downward' force imparted by fluid outlet pressure P2 against lower diaphragm 41, so as to effectively neutralize the contribution of fluid outlet pressure P2 to the position of poppet 27 relative to valve seat 31.

Although a dual diaphragm-based pressure compensation structure of the type shown in FIG. 1 is effective for its intended purpose, it is hardware intensive in terms of the added diaphragm, connecting rods, and increased sized and additional boring of the valve body proper. This added hardware complexity not only increases the size of the assembly, but the cost and complexity of its manufacture.

SUMMARY

In accordance with the present invention, advantage is taken of the magnetic field coupling and fluid containment structure of the integrated ferromagnetic pole piece employed in the solenoid-operated valve described in the above-referenced '397 application, to incorporate a poppet/armature bore-based, pressure-balancing scheme, that not only ensures that valve poppet position will be defined exclusively by the solenoid, but does so in a manner that allows the hardware complexity, size, and cost of assembly to be significantly reduced relative to the prior art, such as the dual diaphragm structure, described supra.

As will be described, the pressure-balanced, solenoid-controlled fluid valve assembly of the instant application includes a valve unit and a solenoid-driven, valve actuator. In the embodiments of the solenoid-driven shown, valve actuator unit is of the type described in the above-referenced '397 application, having an integrated magnetic pole piece that provides fluid leakage containment. This embodiment also couples axial, radial, and magnetic shunt flux paths with a moveable armature without the need for non-magnetic material for alignment, support, or magnetic flux flow path control. The valve unit is similar to those of the above-referenced '425 application, the '947 patent, and '033 patent, positioning a valve poppet relative to a fluid flow orifice through the valve proper.

To balance out fluid inlet and exit port pressures, the valve unit incorporates a fluid flow restriction with the armature/poppet-positioning mechanism between the armature cavity and the fluid inlet cavity. In addition, the poppet and its poppet-positioning armature have an interior bore that serves as an auxiliary fluid path between the fluid exit port and the armature cavity. This combination is effective to balance fluid pressures at the fluid inlet and exit ports applied to the opposite sides of the restriction, in a manner that is complementary to the fluid pressures applied to opposite sides of the poppet, thereby effectively neutralizing the effects of fluid pressure on poppet position.

In a first embodiment, a poppet/armature assembly is coupled with a pressure-balancing diaphragm which has an annular area substantially the same as or very close to the area of the valve bore orifice. The diaphragm is retained by an armature support member, so as to provide a fluid seal between an upper armature cavity containing the armature, and a cavity containing the valve seat, and ported to the fluid inlet port.

The valve actuator unit includes a unitary pole piece having a generally axial pole piece portion, that extends into an upper solenoid/pole piece cavity coupled in fluid communication with the upper armature cavity by way of an annular fluid gap. Fluid leakage containment for this upper cavity structure is provided by the fluid-sealing structure of the pole piece and the diaphragm. The integral pole piece and support architecture do not require a non-magnetic material in the magnetic flux flow path. An axial bore in the lower end of the axial portion of the pole piece accommodates a compression spring urged against the armature and axially biases the armature, and thereby the poppet against the valve seat.

An auxiliary axial bore through the armature provides fluid communication between the valve bore, which is in fluid communication with the fluid exit port, and the axial gap between the lower distal end of the axial portion of the magnetic pole piece. Since the axial gap is in fluid communication with the upper (fluid leakage-contained) cavity structure that includes the upper solenoid/pole piece cavity and the armature cavity, the axial gap couples the exit port pressure to the top side of the fluid restriction diaphragm.

Since, the area of the fluid restriction diaphragm is substantially the same as the valve bore orifice upward force imparted against the poppet by the fluid exit port, pressure is countered by a downward force at that same pressure, that has coupled through the auxiliary bore to the top of the diaphragm. In a complementary manner, the pressure at the fluid inlet port is balanced as a result of a downward force imparted by the fluid inlet pressure against the poppet being substantially the same as the upward force imparted by the pressure against the bottom of the fluid restriction diaphragm.

In a second embodiment, the fluid restriction comprises an O-ring inserted into an annular groove of an armature support member. Similar to the diaphragm of the first embodiment, this O-ring has an annular area substantially the same as or very close to that of the area of the valve bore orifice. A single spiral-configured suspension spring supports the armature-poppet. The pressure-balancing function provided by the O-ring is similar to that of the diaphragm in the first embodiment.

Pursuant to a third embodiment, the fluid restriction mechanism is implemented without a captured element. Instead, the fluid restriction is defined by the geometry of a very narrow annular aperture between the outer surface of the armature-poppet and the inner surface of an armature insertion bore through the surrounding support member. The geometric parameters of the armature-poppet, including its outer diameter and auxiliary internal bore size, and those of the armature insertion bore through the support member, are such as to limit or restrict 'upward' fluid flow of the fluid inlet pressure and 'downward' fluid flow of the fluid outlet pressure, in a manner that is approximately the force imparted by these pressures on opposite sides of the armature-poppet relative to the valve orifice. This neutralizes the contribution of the fluid inlet and outlet pressures on the position of the armature-poppet relative to the valve seat.

DETAILED DESCRIPTION OF EMBODIMENTS OF THE INVENTION

Figure 2:
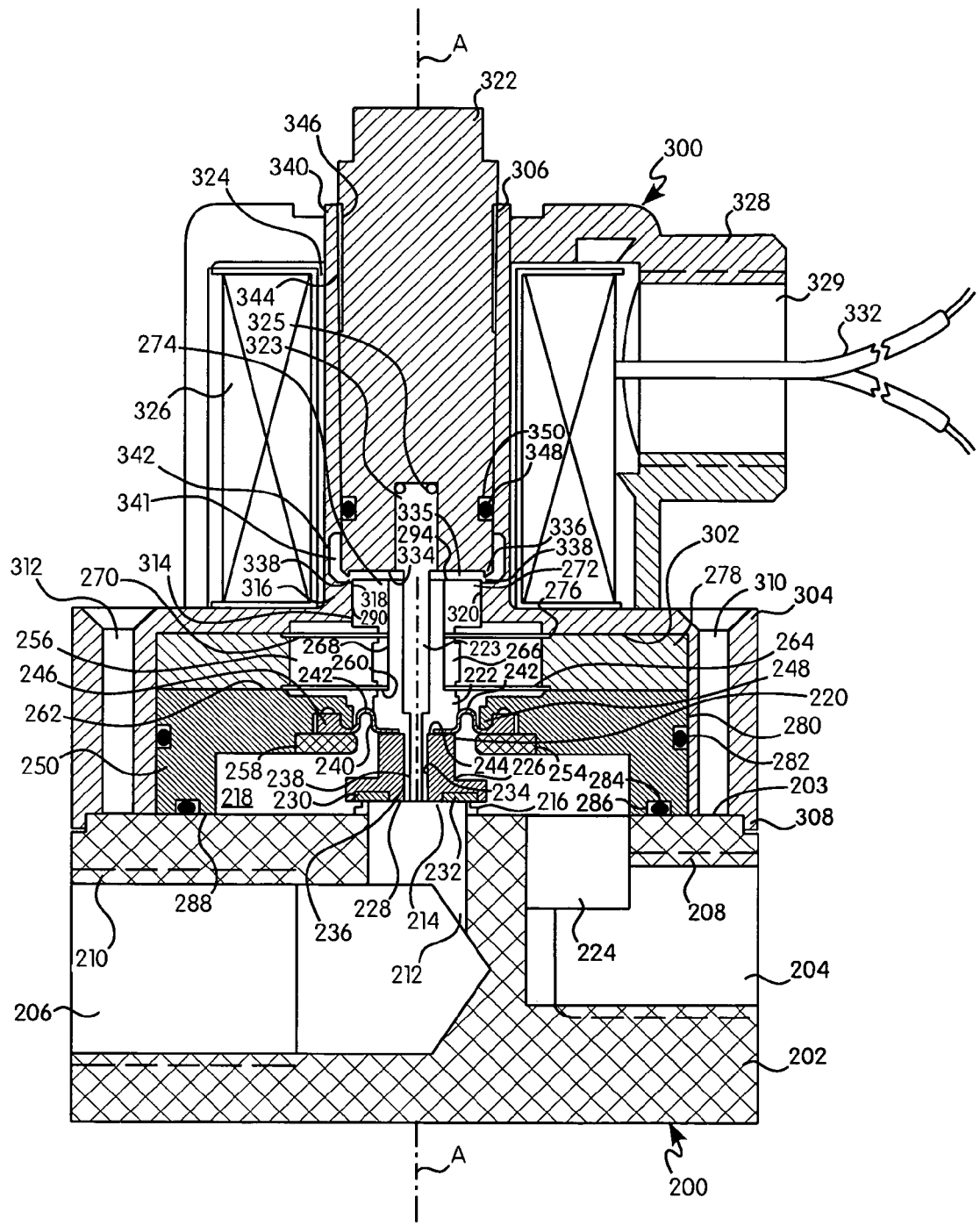
FIG. 2 is a longitudinal, cross-sectional diagrammatic illustration of one embodiment of the improved proportional solenoid-controlled fluid valve assembly embodying the fluid pressure compensation scheme of the invention.

Attention is now directed to FIG. 2, which is a longitudinal, cross-sectional diagrammatic illustration of a proportional solenoid-controlled fluid valve, having a fluid pressure balancing arrangement in accordance with one embodiment of the invention. Unless otherwise indicated or inherently apparent, the architecture of FIG. 2 (as well as those of FIGS. 3 and 4) is generally cylindrically symmetrical about longitudinal axis A.

As pointed out briefly above, and as will be detailed below, this arrangement employs a fluid flow restriction between the armature cavity and the fluid inlet cavity, plus a fluid communication path through the valve closing assembly between the fluid exit port and the armature cavity. The combination of these two mechanisms effectively balances both the inlet and outlet forces acting upon the valve poppet, so that valve poppet position is controlled exclusively by the solenoid.

The solenoid-controlled fluid valve assembly includes a valve unit, the fluid flow path through which is controlled by a solenoid-driven, valve actuator unit. In the embodiment shown, solenoid-driven, valve actuator unit 300 is of the type described in the above-referenced '397 application, and employs an integrated magnetic pole piece that is configured to provide fluid leakage containment, as well as axial, radial, and magnetic shunt flux paths with a moveable armature that drives the valve poppet, but without the conventional need for non-magnetic material for alignment, support, or magnetic flux flow path control.

The valve unit is similar to the valve units of the solenoid-controlled valve assemblies of the above-referenced '425 application, and the '947 and '033 patents, and is operative, under solenoid-driven actuator control, to position a valve poppet relative to a fluid flow orifice through the valve proper. To balance inlet and exit port fluid pressures, valve unit 200 incorporates a fluid flow restriction coupled to the armature/poppet-positioning mechanism between the armature cavity and the fluid inlet cavity. In addition, the poppet and its associated poppet-positioning armature are provided within an interior bore that provides a fluid communication path between the fluid exit port and the armature cavity.

As described herein, this combination of the fluid flow restriction and the fluid communication path causes fluid pressures at the fluid inlet and exit ports to be applied to the opposite sides of the restriction, in a manner that is complementary to the fluid pressures applied to opposite sides of the poppet, thereby effectively neutralizing the effects of fluid pressure on poppet position.

More particularly, the embodiment of valve unit 200 shown in FIG. 2 is comprised of generally cylindrical valve base member 202 having fluid input port 204 and fluid exit port 206. Fluid inlet port 204 and fluid exit port 206 may be interiorly threaded, as shown at 208 and 210, respectively, so as to facilitate their being coupled to respective sections of fluid transporting conduit (not shown). Within valve base member 202, fluid exit port 206 is coupled to a first generally cylindrical interior valve bore 212 that extends to valve orifice 214, that terminates at, and is surrounded by a generally circular valve seat 216.

Figure 3:
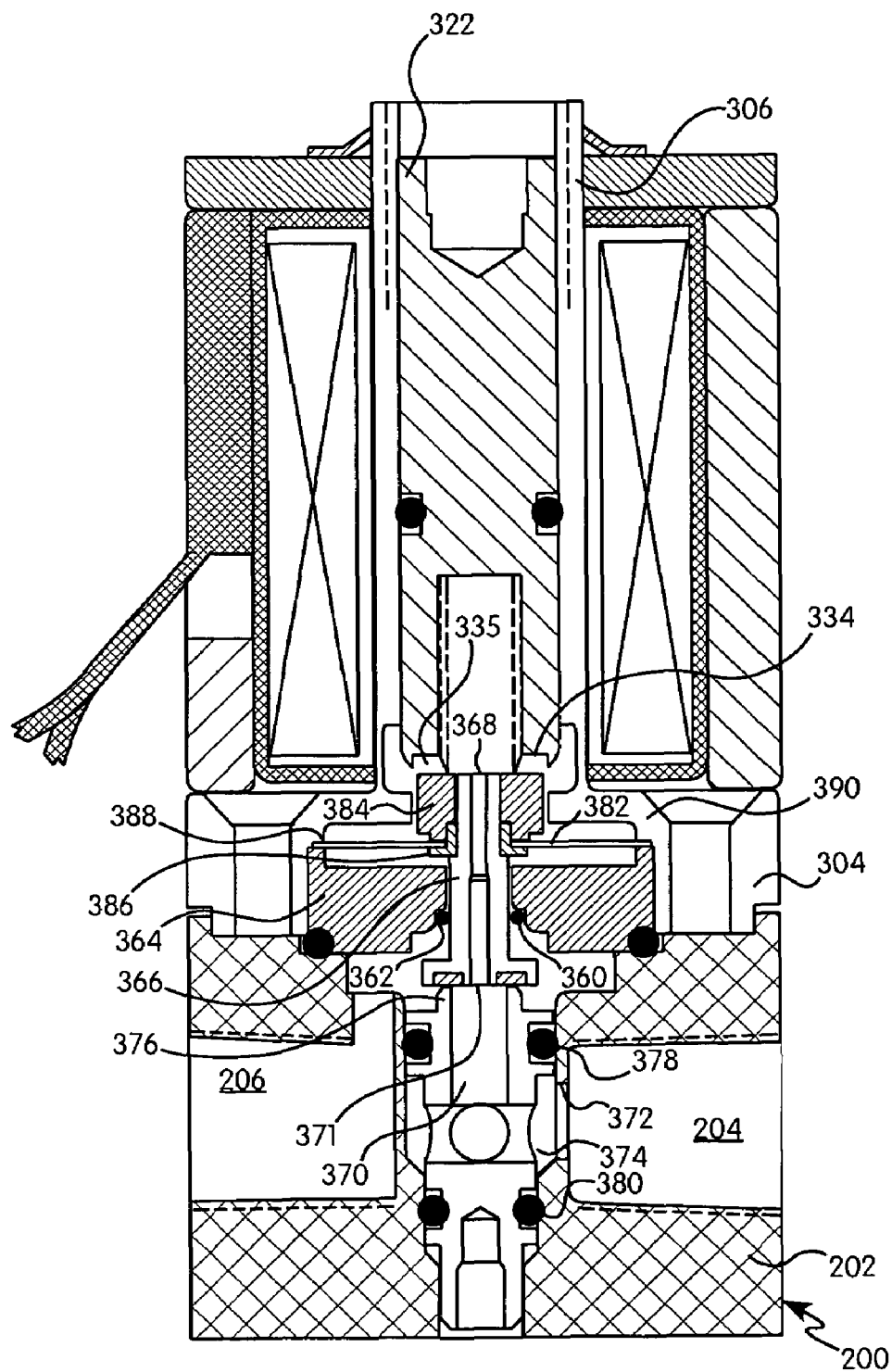
FIG. 3 diagrammatically illustrates a second embodiment of the invention, in which the fluid restriction mechanism is implemented by means of an O-ring inserted into an annular groove of an armature support member.
Figure 4:
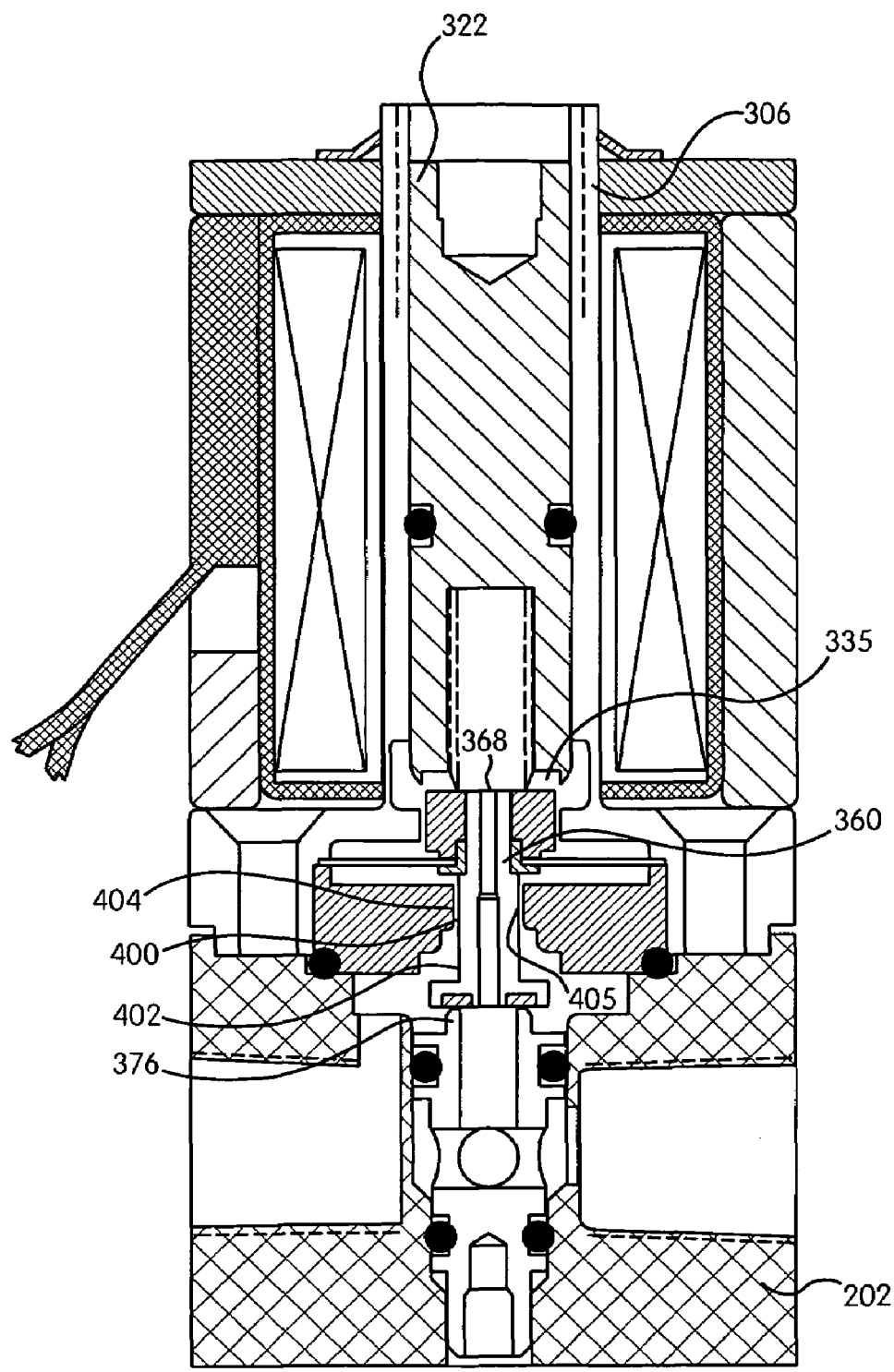
FIG. 4 diagrammatically shows a third embodiment of the invention, in which the fluid restriction mechanism is implemented by a narrow annular aperture between the outer surface of the armature-poppet and the inner surface of an armature insertion bore in the armature support member.

Although valve seat 216 is shown as being positioned within valve base member 202 of valve unit 200, it may alternatively be configured as an adjustable valve seat, such as one installed in a threaded portion of the valve bore (as shown diagrammatically in the embodiments of FIGS. 3 and 4, to be described). In this alternate configuration, valve seat 216 may be maintained in a fluid sealed condition within interior valve bore 212 by means of one or more (e.g., a pair of) O-rings. Valve orifice 214 of interior valve bore 212 opens into interior valve poppet cavity 218 in which a valve poppet 220 is retained by an axially translatable and bored armature 222 for solenoid-controlled closure against and opening away from valve seat 216. Interior valve poppet cavity 218 is coupled to fluid inlet port 204 by way of bore 224 therebetween.

As further shown in FIG. 2, valve poppet 220 may have a generally stepped cylindrical body 226, which terminates at a lower generally circular poppet face 228. Poppet face 228 has depression 230, into which a fluid tight annular sealing ring 232, such as an annular shaped neoprene ring, may be press fit. Sealing ring 232 is sized to cover and thereby seal valve poppet 220 against valve seat 216, when brought into closing contact thereagainst by the solenoid-driven armature 222.

Figure 1:
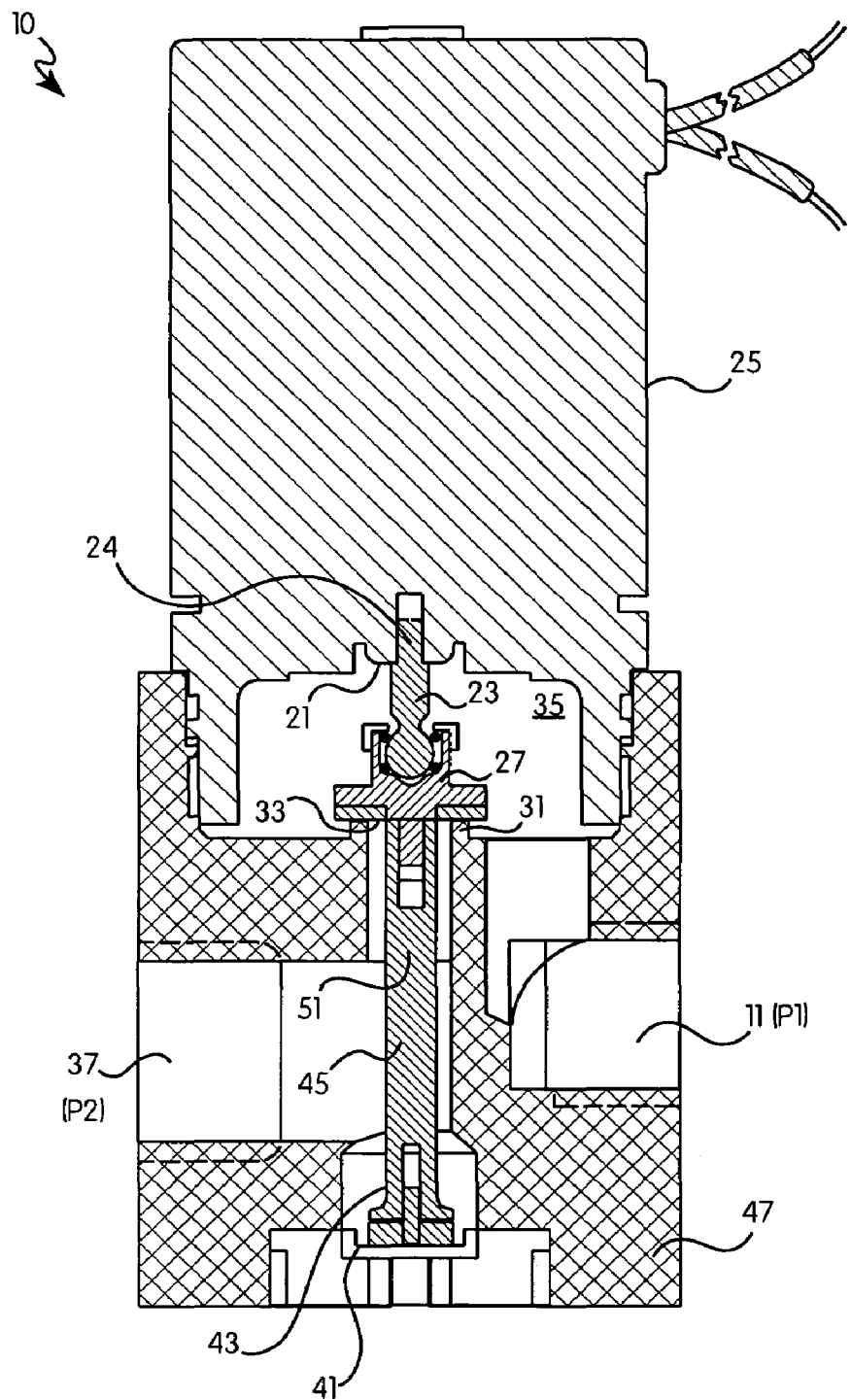
FIG. 1 is a longitudinal, cross-sectional diagrammatic illustration of a proportional solenoid-controlled fluid valve assembly containing a conventional dual diaphragm-based fluid pressure compensation mechanism, as known in the prior art

Valve poppet 220 also includes interior axial bore 234, which is sized to snugly engage and fit upon outer cylindrical surface 236 of a narrow and cylindrical lower end 238 of armature 222. When valve poppet 220 is affixed upon lower end 238 of armature 222, it retains interior ring portion 240 of diaphragm 242 against lower surface 244 of armature 222. Like upper diaphragm 21 in the dual diaphragm structure of FIG. 1, diaphragm 242 of FIG. 2 has an annular area $A_{242}$ that is substantially the same as or very close to that of area $A_{214}$ of bore orifice 214.

A relatively increased thickness, generally circular circumferential portion 246 of diaphragm 242 is captured and sealed between an interiorly projecting radial portion 248 of an inverted, generally cup-shaped armature support member 250, and retaining ring 258 that is fit (e.g., threaded) into a generally circular depression 254 of armature support member 250. When so captured, diaphragm 242 provides a fluid seal between upper armature cavity 256 containing armature 222 and interior valve poppet cavity 218 containing valve poppet 220 and valve seat 216.

Furthermore, armature 222 has a generally annular shoulder 260 that is adapted to cooperate with associated surface 262 of armature support member 250, so as to support first spiral-configured suspension spring 264 on a first side of an inner spring-retaining, ferrule-shaped spacer 266, that is sized to fit around outer cylindrical surface 268 of armature 222.

Second spiral-configured suspension spring 270 is captured between a second side of spacer 266 and a generally cylindrically shaped armature sleeve 272, that is retained upon upper portion 274 of armature 222. A generally circumferential outer region 276 of second spiral-configured suspension spring 270 is captured between a generally disc-shaped support member 278 atop armature support member 250 and interior surface portion 302 of a cup-shaped lower portion 304 of magnetic pole piece 306 of valve actuator unit 300. First spiral-configured suspension spring 264 and second spiral-configured suspension spring 270 are one example of an armature centering mechanism and prevent the off-axis tilt of armature 222. Magnetic pole piece 306 is made of a ferromagnetic material and is comprised of axial portion 322 and sleeve piece portion 340.

As described supra, and as will be described infra in greater detail, this embodiment of valve actuator unit 300 is configured essentially as shown and detailed in the above-referenced '397 application. Lower portion 304 of magnetic pole piece 306 may threadingly engage outer cylindrical surface 280 of armature support member 250, with O-ring 282 providing a fluid seal therebetween. Valve base member 202 is sized to receive and engage a lower interior cylindrical portion 308 of lower portion 304 of magnetic pole piece 306.

Valve actuator unit 300 may be securely attached to valve unit 200 by way of set-screws (not shown) inserted through bores (two of which are shown at 310 and 312) in magnetic pole piece 306, and screwed into tapped bores (not shown) in upper surface 203 of valve base member 202. An O-ring 284 is captured between a generally circular slot 286 of lower surface 288 of armature support member 250 and valve base member 202, so as to seal armature support member 250 against valve base member 202, and thereby provide a sealed or contained fluid flow path between fluid inlet and exit ports 204 and 206, respectively, and interior valve poppet cavity 218.

Armature 222 and associated armature sleeve 272 extend through a generally cylindrical annular bore 314 formed by a radially inward projecting portion 316 of magnetic pole piece 306 (that is solid with lower portion 304 thereof). As a result, outer cylindrical surface 290 of armature sleeve 272 is slightly radially spaced apart from interior cylindrical surface 318 of projection portion 316 of magnetic pole piece 306 and forms a very narrow annular fluid air gap 320 therebetween.

Annular bore 314 opens into upper solenoid/pole piece cavity 341 which is bounded by a relatively thin portion 342 of a generally annular sleeve pole piece portion 340 of magnetic pole piece 306. This upper solenoid/pole piece cavity 341 is in fluid communication with upper armature cavity 256 by way of fluid/air gap 320 between projection portion 316 and armature sleeve 272. As will be described infra, fluid leakage containment for this upper cavity structure is provided by the fluid-sealing integrated structure of magnetic pole piece 306 on one side and diaphragm 242 on the other. As provided supra, diaphragm 242 provides a fluid seal between upper armature cavity 256, with armature 222 disposed therein, and interior valve poppet cavity 218, in which valve poppet 220 and valve seat 216 are disposed.

Because fluid/air gap 320 is very narrow and of a fixed radial distance, the magnetic flux path between armature 222 and projecting portion 316 of magnetic pole piece 306 is a low magnetic reluctance radial path. Thus, as in the patented architectures referenced above, the substantial reluctance of the axial air gap 335 between armature 222 and lower distal end 334 of generally axial portion 322 of magnetic pole piece 306, in combination with the relatively low magnetic reluctance in the radial direction across the radial air gap 338, effectively by-passes axial air gap 335 and confines the magnetic flux to radial air gap 338.

Armature 222 terminates at a generally planar, circular top surface 294 adjacent to axial portion 322 of magnetic pole piece 306. Axial portion 322 of magnetic pole piece 306 is configured of a generally cylindrical solid ferromagnetic element which is generally coaxial with axis A and is sized to fit within the generally cylindrical axial bore 324 of solenoid coil 326. In the embodiment shown, solenoid coil 326 may be installed within housing 328, also made of ferromagnetic material. Housing 328 may be provided with a sidewall aperture or bore 329 for electrical leads 332 which supply an electrical connection between solenoid coil 326 and a current control source (not shown).

Axial portion 322 of magnetic pole piece 306 has lower distal end 334 that is axially spaced apart from and magnetically coupled to top surface 294 of armature 222, so as to form axial air gap 335 therebetween. Axial bore 323 formed in lower distal end 334 of axial portion 322 of magnetic pole piece 306 receives compression spring 325 that is urged against top surface 294 of armature 222, and serves to axially bias armature 222 and associated valve poppet 220 downwardly so that valve poppet 220 is urged against the valve seat 216.

Extending axially outward from lower distal end 334 of axial portion 322 of magnetic pole piece 306 is a generally tubular or ferrule-shaped projection 336, having a tapered or varying thickness in the axial direction. Ferrule-shaped projection 336 is radially spaced apart from and magnetically coupled to outer cylindrical surface 290 of armature sleeve 272 of armature 222, by radial air gap 338 therebetween, so as to form a magnetic flux path shunt.

Alternatively, in lieu of providing ferrule-shaped projection 336 on lower distal end 334 of axial portion 322 of magnetic pole piece 306, an equivalent projection may be provided by configuring top surface 294 of armature 222 with a tapered annular projection, that is spaced apart from and magnetically coupled with lower distal end 334 of axial portion 322 of magnetic pole piece 306; that is, reverse the positioning of ferrule-shaped portion 336 so that it is on armature 222 which would then fit around lower distal end 334 of magnetic pole piece 306, still forming axial air gap 335 therebetween. In either case, ferrule-shaped projection 336 allows for axial translation of armature 222 relative to magnetic pole piece 306.

Magnetic pole piece 306 further includes generally annular sleeve pole piece portion 340 that is continuous with axial portion 322 and includes relatively thin portion 342 that is radially spaced apart from lower distal end 334 of axial portion 322 and becomes rapidly saturated by the magnetic field generated by solenoid coil 326. To provide for fluid leakage containment, sleeve pole piece portion 340 is made effectively mechanically solid with the main axial portion 322 of magnetic pole piece 306.

In the embodiment of FIG. 2, fluid leakage containment is accomplished by configuring axial portion 322 as a generally cylindrical component and externally threaded as shown at 344, so that it may be threaded into a threaded interior cylindrical bore 346 of sleeve pole piece portion 340 of magnetic pole piece 306. A fluid seal is provided by means of O-ring 348 captured within annular groove 350 formed within the sidewall of axial portion 322. In an alternate configuration, axial portion 322 and sleeve pole piece portion 340 are formed of one integrated piece so as to obviate the need for an O-ring.

Relatively thin portion 342 of sleeve pole piece portion 340 extends to and is solid with projection portion 316 of magnetic pole piece 306. For mechanical alignment, the cylindrical shape of fluid/air gap 320 between upper portion 274 of armature 222 and projection portion 316 prevents movement of armature 222 in the radial direction. This serves to prevent potential off-axis distortion of first spiral-configured suspension spring 264 and second spiral-configured suspension spring 270, so that proper operation of the valve is not impaired. Axial alignment is reinforced by the fact that fluid/air gap 320 is radially aligned with and axially offset from radial air gap 338, thereby providing a pair of axially displaced coaxial guide air-bushings that prevent off-axis play between armature 222 and magnetic pole piece 306.

However, as described in the '397 application, unlike conventional solenoid structures, magnetic pole piece 306, relatively thin portion 342, and the support architecture do not require a non-magnetic spacer in the magnetic flux flow path. This reduces manufacturing and hardware complexity and cost associated with solenoid structures having non-ferromagnetic materials as part of flux path containment and pole piece-armature alignment.

As pointed out briefly above, the fluid pressure balancing mechanism of the invention takes advantage of the fluid leakage containment functionality of magnetic pole piece 306 by incorporating an additional fluid flow restriction mechanism between upper armature cavity 256 and interior valve poppet cavity 218 and providing an auxiliary fluid communication path between upper armature cavity 256 and fluid exit port 206. In order to realize a compact structure, this auxiliary communication path is readily implemented without the need for any additional components, such as the connecting rod and additional diaphragm components employed in the assembly of FIG. 1, described supra.

Instead, as shown in the embodiment of FIG. 2, auxiliary axial bore 223 is formed through armature 222, so as to provide fluid communication between interior valve bore 212 (which is in fluid communication with fluid exit port 206) and axial air gap 335 between lower distal end 334 of axial portion 322 of magnetic pole piece 306 and armature sleeve 272. Since axial air gap 335 is in fluid communication with the upper (fluid leakage-contained) cavity structure that includes the upper solenoid/pole piece cavity 341 and upper armature cavity 256, axial air gap 335 couples the pressure P2 supplied via auxiliary axial bore 223 from fluid exit port 206 to the top side of diaphragm 242.

As described supra, the fluid restricting diaphragm 242 has an annular area $A_{242}$ that is substantially the same as or very close to that of the area $A_{214}$ of orifice 214 of interior valve bore 212. As a result, any upward force imparted by the pressure P2 at fluid exit port 206 against poppet face 228 of valve poppet 220 will be countered by 'downward' force imparted by the pressure P2 which has coupled through auxiliary axial bore to the top of diaphragm 242. This serves to effectively neutralize the contribution of the pressure P2 to the position of valve poppet 220 relative to valve seat 216.

In a complementary fashion, the pressure P1 at the fluid inlet port 204 is balanced as a result of a downward force (as viewed in the embodiment shown in FIG. 2) imparted by the inlet fluid pressure P1 against valve poppet 220 being substantially the same as the 'upward' force imparted by the pressure P1 against the bottom of diaphragm 242.

FIG. 3 diagrammatically illustrates an alternate embodiment of the invention in which the fluid restriction mechanism is implemented by means of O-ring 360 inserted into annular groove 362 of armature support member 364. Similar to diaphragm 242 of the embodiment shown in FIG. 2, O-ring 360 has an annular area $A_{360}$ that is substantially the same as or very close to that of the area $A_{371}$ of orifice 371 of valve bore 370.

In this embodiment, and also the embodiment of FIG. 4, to be described, the armature/poppet assembly is shown as being configured as a single integrated armature/poppet element 366. This armature/poppet element 366 contains auxiliary axial bore 368 which provides fluid communication between valve bore 370 and axial air gap 335 between the lower distal end 334 of axial portion 322 of magnetic pole piece 306.

Moreover, as described supra, in the embodiments of the valve unit shown in FIG. 3 and FIG. 4, valve seat 376 is shown as having the above-described alternative adjustable configuration and being installed using threaded portion 372 of valve seat installation bore 374 in valve base member 202. The valve seat 376 is maintained in a fluid sealed condition within valve seat installation bore 374 by O-rings 378 and 380.

Also, a single spiral-configured suspension spring 382 is used to support armature/poppet element 366. In the embodiment shown in FIG. 3, spiral-configured suspension spring 382 is held against armature sleeve 384 by a retention washer 386. A generally outer circumferential region 388 of spiral-configured suspension spring 382 is captured between armature support member 364 and interior ledge surface portion 390 of lower portion 304 of magnetic pole piece 306.

The pressure-balancing function provided by the O-ring 360 in embodiment of FIG. 3 is similar to that of diaphragm 242 in the embodiment of FIG. 2 in that an upward force imparted by the outlet fluid pressure P2 at fluid exit port 206 against the bottom of the armature/poppet element 366 will be countered by 'downward' force imparted by the outlet fluid pressure P2 which has coupled through auxiliary axial bore 368 to the top of O-ring 360. Also, the pressure P1 at fluid inlet port 204 is balanced as a result of a downward force imparted by the inlet fluid pressure P1 against armature/poppet element 366 being substantially the same as the 'upward' force imparted by the pressure P1 against the bottom of O-ring 360.

FIG. 4 diagrammatically illustrates a third embodiment of the invention, in which the fluid restriction mechanism is implemented without a captured element, such as diaphragm 242 in the embodiment of FIG. 2 or O-ring 360 in the embodiment of FIG. 3. Instead, the restriction is defined by the geometry of a very narrow annular aperture 400 formed between cylindrical outer surface 402 of armature/poppet element 366 and cylindrical inner surface 404 of armature insertion bore 405 through the surrounding armature support member 364.

In this embodiment, the geometric parameters of the armature/poppet element 366 (including its outer diameter and auxiliary internal bore size) and armature insertion bore 405 through armature support member 364 are defined such as to limit or restrict 'upward' fluid flow therethrough of the inlet pressure P1 and 'downward' fluid flow therethrough of the outlet pressure P2 in a manner that is proximate the force imparted by these pressures on opposite sides of armature/poppet element 366 relative to orifice 371. Again, the net result is to neutralize the contribution of each of the fluid inlet and outlet pressures P1 and P2 on the position of armature/poppet element 366 relative to valve seat 376 in a simpler mechanical manner as compared to the prior art discussed supra.

As will be appreciated from the foregoing description, the solenoid-actuated valve assembly not only effectively balances inlet and outlet pressures P1 and P2 of fluid inlet and outlet ports 204 and 206 of the valve, but is implemented with reduced hardware complexity. The incorporation of a fluid flow restriction between upper armature cavity 256 and fluid inlet port 204 and bore 224, plus a fluid communication path through the valve closing assembly, provides a highly integrated structure that reduces overall size and cost of assembly.

While I have shown and described several embodiments in accordance with the present invention, it is to be understood that the same is not limited thereto, but is susceptible to numerous changes and modifications as known to a person skilled in the art, and it is intended that the present invention not be limited to the details shown and described herein, but rather cover all such changes and modifications as are obvious to one of ordinary skill in the art.

What is claimed is:

1. A valve assembly comprising:
    a solenoid coil adapted to generate a magnetic flux, and having a longitudinal axis and a bore coaxial therewith;
    an axially translatable armature made of a magnetic material, said armature supported within an armature cavity for axial translation along said longitudinal axis;
    a magnetic pole piece disposed within said bore of said solenoid coil, said magnetic pole piece having a lower distal end and being magnetically coupled to said armature and forming an axial air gap and a radial air gap between said armature and said lower distal end of said magnetic pole piece, said magnetic pole piece comprised of a sleeve piece portion and an axial portion, said sleeve piece portion further comprised of a relatively thin portion contiguous with said sleeve piece portion, said relatively thin portion rapidly saturating when said valve assembly is subject to said magnetic flux and being magnetically coupled to said armature;
    a valve unit, mechanically coupled to said armature, said valve unit having an interior valve poppet cavity in fluid communication with a fluid inlet port to which fluid is applied at a first fluid pressure and a fluid exit port from which said fluid is output at a second fluid pressure and containing a valve seat therebetween, said valve seat adapted to be closed by a valve closing assembly comprised of a valve poppet mechanically coupled to said armature, so as to regulate fluid flow between said fluid inlet port and said fluid exit port;

an armature centering mechanism to prevent off-axis tilting of said armature; and a fluid pressure balancing arrangement adapted to compensate for said first fluid pressure and said second fluid pressure being exerted against said valve poppet, said fluid pressure balancing arrangement comprising a diaphragm between said armature cavity and said interior valve poppet cavity and a fluid communication path through said valve closing assembly, said fluid communication path providing fluid communication between said fluid exit port and said armature cavity.

2. The valve assembly according to claim 1, wherein said valve poppet further comprises a sealing ring disposed on a poppet face of said valve poppet to form a fluid-tight seal between said valve poppet and said valve seat in a manner that prevents fluid communication between said fluid inlet port and said fluid exit port.

3. The valve assembly according to claim 1, wherein said armature is further comprised of a ferrule-shaped projection, said ferrule shaped projection of said armature forming said radial air gap between said magnetic pole piece and said armature.

4. The valve assembly according to claim 1, wherein said lower distal end of said magnetic pole piece is further comprised of a ferrule-shaped projection, said ferrule-shaped projection forming said radial air gap between said magnetic pole piece and said armature.

5. The valve assembly according to claim 1, wherein said sleeve pole piece portion and said relatively thin portion of said magnetic pole piece are solid with a lower portion of said magnetic pole piece so that support for and axial alignment of said lower distal end of said magnetic pole piece relative to said armature is provided by said relatively thin portion and said sleeve pole piece portion of said magnetic pole piece continuous therewith, and is exclusive of a non-magnetic element.

6. The valve assembly according to claim 1, wherein said relatively thin portion, said sleeve piece portion, and said lower portion of said magnetic pole piece are adapted to receive said solenoid coil.

7. The valve assembly according to claim 1, wherein said sleeve piece portion of said magnetic pole piece further includes a radially inwardly projecting portion that is adjacent to, but radially spaced apart from, and magnetically coupled to said armature.

8. The valve assembly according to claim 1, wherein said sleeve piece portion and said axial portion of said magnetic pole piece are configured to be one integral component.

9. The valve assembly according to claim 1, wherein said axial portion of said magnetic pole piece is axially adjustable relative to said sleeve piece portion and said relatively thin portion of said magnetic pole piece.

10. The valve assembly according to claim 9, wherein said sleeve piece portion and said axial portion of said magnetic pole piece are provided with a fluid seal therebetween.

11. The valve assembly according to claim 1, wherein said assembly further includes a biasing member disposed substantially within said bore of said solenoid coil and between said magnetic pole piece and said armature for biasing said armature away from said lower distal end of said magnetic pole piece.

12. The solenoid-actuated valve assembly according to claim 11, wherein said biasing member is a spring.

13. The valve assembly according to claim 1, wherein said diaphragm has an annular area substantially the same as an annular area of said valve seat.

14. The valve assembly according to claim 1, wherein said armature centering mechanism is a pair of spiral-configured suspension springs.

15. The valve assembly according to claim 1, wherein said valve assembly further comprises an O-ring to prevent fluid leakage between said valve unit and said armature cavity.

16. A solenoid-actuated valve assembly comprising:

a solenoid coil having a longitudinal axis and a solenoid bore coaxial therewith, said solenoid coil producing a magnetic flux;

a magnetic pole piece comprised of an axial portion, a lower distal end, and a sleeve piece portion, said magnetic pole piece supported within said solenoid bore and exclusive of the use of non-magnetic material, said sleeve piece portion further comprised of a relatively thin portion contiguous with said sleeve piece portion, said relatively thin portion rapidly saturating when said valve is subject to said magnetic flux;

an axially translatable armature made of a magnetic material, said armature being supported substantially within an armature cavity for axial translation along said longitudinal axis, said armature forming an axial gap and a radial air gap with said magnetic pole piece, said armature magnetically coupled to said relatively thin portion of said magnetic pole piece, and said armature having an internal bore therethrough providing fluid communication with said solenoid bore;

a valve unit, mechanically coupled to said armature, said valve unit having an interior valve poppet cavity in fluid communication with a fluid inlet port to which fluid is applied at a first fluid pressure and a fluid exit port from which said fluid is output at a second fluid pressure and containing a valve seat therebetween, said valve seat adapted to be closed by a valve closing assembly comprised of a valve poppet mechanically coupled to said armature, so as to regulate fluid flow between said fluid inlet port and said fluid exit port;

an armature centering mechanism to prevent off-axis tilting of said armature;

a fluid pressure balancing arrangement adapted to compensate for said first fluid pressure and said second fluid pressure being exerted against said valve poppet, said fluid pressure balancing arrangement comprising a diaphragm between said armature cavity and said interior valve poppet cavity and a fluid communication path through said valve closing assembly, said fluid communication path providing fluid communication between said fluid exit port and said armature cavity; and a spring disposed substantially within said solenoid bore of said solenoid coil and between said magnetic pole piece and said armature for biasing said armature away from said lower distal end of said magnetic pole piece.

17. The solenoid-actuated valve assembly according to claim 16, wherein said valve poppet further comprises a sealing ring disposed on a poppet face of said valve poppet to form a fluid-tight seal between said valve poppet and said valve seat in a manner that prevents fluid communication between said fluid inlet port and said fluid exit port.

18. The solenoid-actuated valve assembly according to claim 16, wherein said armature is further comprised of a ferrule-shaped projection, said ferrule shaped projection of said armature forming said radial air gap between said magnetic pole piece and said armature.

19. The solenoid-actuated valve assembly according to claim 16, wherein said lower distal end of said magnetic pole piece is further comprised of a ferrule-shaped projection, said ferrule-shaped projection forming said radial air gap between said magnetic pole piece and said armature.

20. The solenoid-actuated valve assembly according to claim 16, wherein said sleeve pole piece portion and said relatively thin portion of said magnetic pole piece are solid with a lower portion of said magnetic pole piece so that support for and axial alignment of said lower distal end of said magnetic pole piece relative to said armature is provided by said relatively thin portion and said sleeve pole piece portion of said magnetic pole piece continuous therewith, and is exclusive of a non-magnetic element.

21. The solenoid-actuated valve assembly according to claim 16, wherein said relatively thin portion, said sleeve piece portion, and said lower portion of said magnetic pole piece are adapted to receive said solenoid coil.

22. The solenoid-actuated valve assembly according to claim 16, wherein said sleeve piece portion of said magnetic pole piece further includes a radially inwardly projecting portion that is adjacent to, but radially spaced apart from, and magnetically coupled to said armature.

23. The solenoid-actuated valve assembly according to claim 16, wherein said sleeve piece portion and said axial portion of said magnetic pole piece are configured to be one integral element.

24. The solenoid-actuated valve assembly according to claim 16, wherein said axial portion of said magnetic pole piece is axially adjustable relative to said sleeve piece portion and said relatively thin portion of said magnetic pole piece.

25. The solenoid-actuated valve assembly according to claim 24, wherein said sleeve piece portion and said axial portion of said magnetic pole piece are provided with a fluid seal therebetween.

26. The solenoid-actuated valve assembly according to claim 16, wherein said diaphragm has an annular area substantially the same as an annular area of said valve seat.

27. The solenoid-actuated valve assembly according to claim 16, wherein said armature centering mechanism is a pair of spiral-configured suspension springs.

28. The solenoid-actuated valve assembly according to claim 16, wherein said valve assembly further comprises an O-ring to prevent fluid leakage between said valve unit and said armature cavity.

29. A valve assembly comprising:
a solenoid coil adapted to generate a magnetic flux, and having a longitudinal axis and a bore coaxial therewith;
an axially translatable armature made of a magnetic material, said armature supported within an armature cavity for axial translation along said longitudinal axis;
a magnetic pole piece disposed within said bore of said solenoid coil, said magnetic pole piece comprised of an axial portion, a lower distal end, and a sleeve piece portion, said magnetic pole piece being magnetically coupled to said armature and forming an axial air gap and a radial air gap between said armature and said lower distal end of said magnetic pole piece, and said sleeve piece portion further comprised of a relatively thin portion contiguous with said sleeve piece portion, said relatively thin portion rapidly saturating when said valve is subject to said magnetic flux;
a valve unit, mechanically coupled to said armature, said valve unit having an interior valve poppet cavity in fluid communication with a fluid inlet port to which fluid is applied at a first fluid pressure and a fluid exit port from which said fluid is output at a second fluid pressure and containing a valve seat therebetween, said valve seat adapted to be closed by a valve closing assembly comprised of a valve poppet mechanically coupled to said armature, so as to regulate fluid flow between said fluid inlet port and said fluid exit port;
an armature centering mechanism to prevent off-axis tilting of said armature; and
a fluid pressure balancing arrangement adapted to compensate for said first fluid pressure and said second fluid pressure being exerted against said valve poppet, said fluid pressure balancing arrangement comprising a diaphragm between said armature cavity and said interior valve poppet cavity and a fluid communication path through said valve closing assembly, said fluid communication path providing fluid communication between said fluid exit port and said armature cavity.

30. The valve assembly according to claim 29, wherein said valve poppet further comprises a sealing ring disposed on a poppet face of said valve poppet to form a fluid-tight seal between said valve poppet and said valve seat in a manner that prevents fluid communication between said fluid inlet port and said fluid exit port.

31. The valve assembly according to claim 29, wherein said armature is further comprised of a ferrule-shaped projection, said ferrule shaped projection of said armature forming said radial air gap between said magnetic pole piece and said armature.

32. The valve assembly according to claim 29, wherein said lower distal end of said magnetic pole piece is further comprised of a ferrule-shaped projection, said ferrule-shaped projection forming said radial air gap between said magnetic pole piece and said armature.

33. The valve assembly according to claim 29, wherein said sleeve pole piece portion and said relatively thin portion of said magnetic pole piece are solid with a lower portion of said magnetic pole piece so that support for and axial alignment of said lower distal end of said magnetic pole piece relative to said armature is provided by said relatively thin portion and said sleeve pole piece portion of said magnetic pole piece continuous therewith, and is exclusive of a non-magnetic element.

34. The valve assembly according to claim 29, wherein said relatively thin portion, said sleeve piece portion, and said lower portion of said magnetic pole piece are adapted to receive said solenoid coil.

35. The valve assembly according to claim 29, wherein said sleeve piece portion of said magnetic pole piece further includes a radially inwardly projecting portion that is adjacent to, but radially spaced apart from, and magnetically coupled to said armature.

36. The valve assembly according to claim 29, wherein said sleeve piece portion and said axial portion of said magnetic pole piece are configured to be one integral component.

37. The valve assembly according to claim 29, wherein said axial portion of said magnetic pole piece is axially adjustable relative to said sleeve piece portion and said relatively thin portion of said magnetic pole piece.

38. The valve assembly according to claim 37, wherein said sleeve piece portion and said axial portion of said magnetic pole piece are provided with a fluid seal therebetween.

39. The valve assembly according to claim 29, wherein said assembly further includes a biasing member disposed substantially within said bore of said solenoid coil and between said magnetic pole piece and said armature for biasing said armature away from said lower distal end of said magnetic pole piece.

40. The solenoid-actuated valve assembly according to claim 39, wherein said biasing member is a spring.

41. The valve assembly according to claim 29, wherein said diaphragm has an annular area substantially the same as an annular area of said valve seat.

42. The valve assembly according to claim 29, wherein said armature centering mechanism is a pair of spiral-configured suspension springs.

43. The valve assembly according to claim 29, wherein said valve assembly further comprises an O-ring to prevent fluid leakage between said valve unit and said armature cavity.

* * * * *